United States Patent [19]

Alessio et al.

[11] 4,179,598

[45] Dec. 18, 1979

[54] ELECTRIC RESISTANCE WELDING MACHINE

[76] Inventors: Attilio Alessio, Strada San Gillio 23, I - 10.040 Druento (Turin); Carlo Parpaiola; Pier Antonio, both of Via Garibaldi 48, I - 10.091 Alpignano (Turin), all of Italy

[21] Appl. No.: 863,576

[22] Filed: Dec. 22, 1977

[30] Foreign Application Priority Data

Jan. 28, 1977 [IT] Italy ................................ 67174 A/77

[51] Int. Cl.² ........................ B23K 11/24; B23K 37/04
[52] U.S. Cl. .................................. 219/79; 219/86.25; 219/116; 219/159
[58] Field of Search .................... 219/116, 86.1, 86.25, 219/159, 158, 179, 180

[56] References Cited

U.S. PATENT DOCUMENTS

| 1,041,778 | 10/1912 | Gravell | 219/86.25 |
| 1,351,909 | 9/1920 | Johnson | 219/86.1 |
| 2,232,450 | 2/1941 | Hagedorn | 219/86.1 |
| 2,556,602 | 6/1951 | Schwartz | 219/116 |

FOREIGN PATENT DOCUMENTS 1938739 3/1966 Fed. Rep. of Germany .

Primary Examiner—Bruce A. Reynolds
Assistant Examiner—Keith E. George
Attorney, Agent, or Firm—Young & Thompson

[57] ABSTRACT

An electric resistance welding machine in which the welding transformer is rigidly connected to an implement holding head vertically movable on an upper bracket of the machine structure, and therefore it follows the vertical movements of the welding implement so as to reduce the electrical impedance of the circuit. A workpiece-holding table is movably mounted on a lower bracket of the machine and has a lower rib which during welding is clamped by a clamping device for providing electric contact.

9 Claims, 3 Drawing Figures

ELECTRIC RESISTANCE WELDING MACHINE

BACKGROUND OF THE INVENTION

The present invention relates to an electric resistance welding machine characterized by features which ensure a considerable versatility thereof, in the sense of its adaptability to various types of work, and a high productivity under the best conditions of efficiency.

In the welding machines adapted selectively to perform different welding operations, comprising a workpiece holding lower bracket, an upper bracket and an implement holding head movable in the upper bracket, the free height between the brackets must be considerable so as to allow, when necessary, the use of welding implements of considerable height. This has the disadvantage of rendering more extensive the welding circuit connected to the transformer mounted within the upper bracket or near it, and involving an unnecessary increase of the impedance and hence power losses in the secondary circuit which, when the implement is in the working position, could have much smaller dimensions.

Another disadvantage of the known welding machines of the type provided with a movable (translating or rotatable) workpiece-holding table consists in the difficulty of connecting the table to the secondary welding circuit in a way suitable for the transmission of the high currents involved.

BRIEF SUMMARY OF THE INVENTION

It is a first object of the present invention to conciliate the requirement of having the possibility to mount onto the head of the machine either small welding implements or welding implements of considerable overall dimensions, as well as having available large operational spaces, with the clashing requirement of having at one's disposal, during the welding operation, a welding circuit having the smallest possible inductance. This object is attained according to the present invention by the fact that the welding transformer is not installed in a fixed position on or near the upper bracket of the machine, as is usual, but is rigidly connected to the vertically movable implement holding head, so that as the welding operation is being carried out the transformer also approaches the workpiece to be welded, thus minimizing the extent of the secondary circuit and hence its inductance.

In connection with this characteristic of the invention there is also provided a sliding connection means between a current feeding bar, rigidly connected to the transformer and movable vertically therewith, and the workpiece holding means on the lower bracket of the machine.

Another object of the present invention is to obtain an efficient electrical connection between the secondary circuit and the workpiece holding table, at the moment of carrying out a welding operation, in the cases in which the table is movable. This object is attained according to the present invention by the fact that the movable table is provided on its lower side with a rib directed according to the path of movement of the table (which path is rectilinear when the table is movable translationally, and is circular when the table is movable rotatably), and that at said rib there is provided a clamping means arranged to tightly apply against said rib a conductive jaw connected to the secondary winding of the welding transformer, during the welding periods.

BRIEF DESCRIPTION OF THE DRAWINGS

These and other characteristics of the invention will now be described in more detail with reference to an embodiment, given by way of non limiting example only, of a welding machine according to the invention, diagrammatically shown in the accompanying drawings, in which.

DETAILED DESCRIPTION OF THE PREFERRED EMBODIMENT

Figure 1:
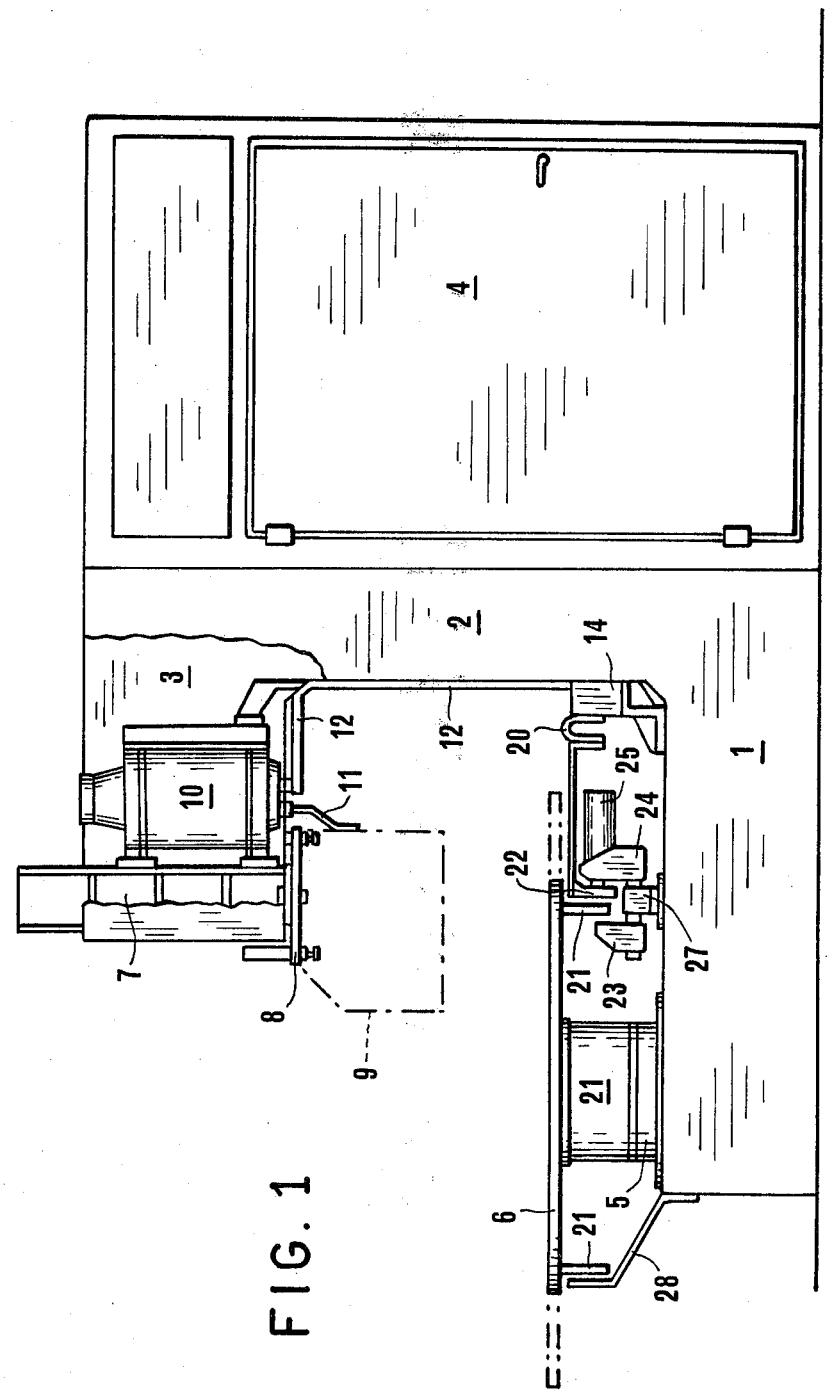
FIG. 1 is a partly sectional side elevational view, on a small scale, of the welding machine of the invention.

The machine shown in the drawings is of a type which possesses all the characteristics according to the present invention, but it is to be understood that these characteristics may also be utilized individually in those cases in which a combination thereof is not required.

The machine shown in FIG. 1 comprises a substantially C-shaped structure resulting from a lower bracket 1, a column 2 and an upper bracket 3, which may be formed integrally with each other. Column 2 is extended rearwardly by a cubicle 4 containing the auxiliary apparatuses.

In the present case the lower bracket 1 supports, by means of a support 5, a rotatable table 6 which, as shown by full and dashed lines respectively, may have a larger or a smaller diameter depending on the working requirements involved. The rotatable table allows carrying out, on sections of the table, workpiece assembly and disassembly operations, whilst on the section situated near the implements the welding operations are carried out. The means for controlling the rotation of the table 6 and its stopping in the correct position are not shown because they do not concern the application of the present invention and may be of a type per se known.

The upper bracket 3 carries, in a vertically movable fashion, an implement holding head which comprises a portion 7 in the form of a guide and a portion 8 forming a support for the welding implements, one of which is shown at 9 with dashed lines. The means for controlling the lifting and lowering of the head 7-8 and its stopping in the correct position are not shown because they do not concern the application of the invention and may be of a type known per se. Also, neither described nor shown are the programming means which control and coordinate the various functions of the machine.

According to the first characteristic of the invention, the welding transformer 10 is not applied to any fixed support means, as usual, but is rigidly connected to the guide element 7 of the vertically movable head, thus following the displacements of the latter.

A first advantageous consequence of this arrangement is that the electric connection of the welding implement 9 to one or, if necessary, to both poles of the secondary winding of the welding transformer 10 may be effected by means of rigid conductors 11, without the interposition of flexible plaited conductors or movable connections.

In the cases in which the welding implement 9 is bipolar and the welding circuit does not affect the workpiece holding support, no other electric connection of the secondary winding of the transformer 10 is required.

Figure 3:
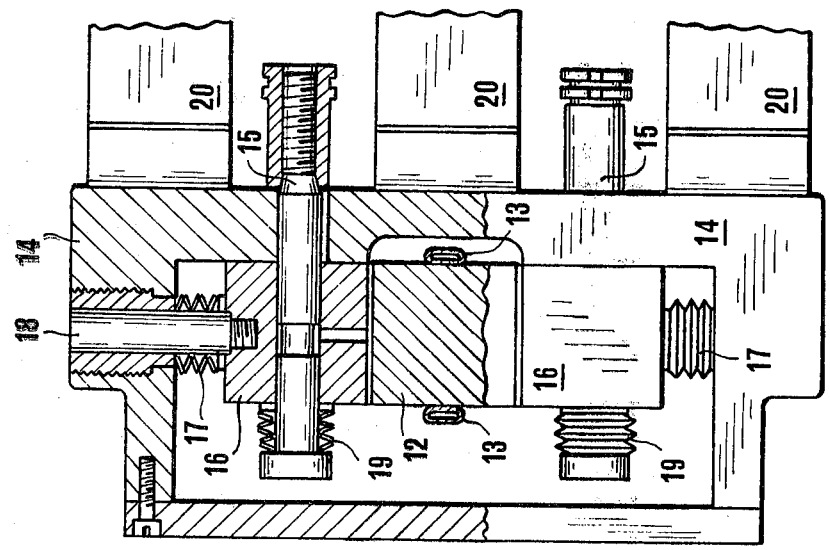
FIG. 3 is a partly sectional plan view, on a still larger scale, of the sliding connection device for the welding circuit.
Figure 2:
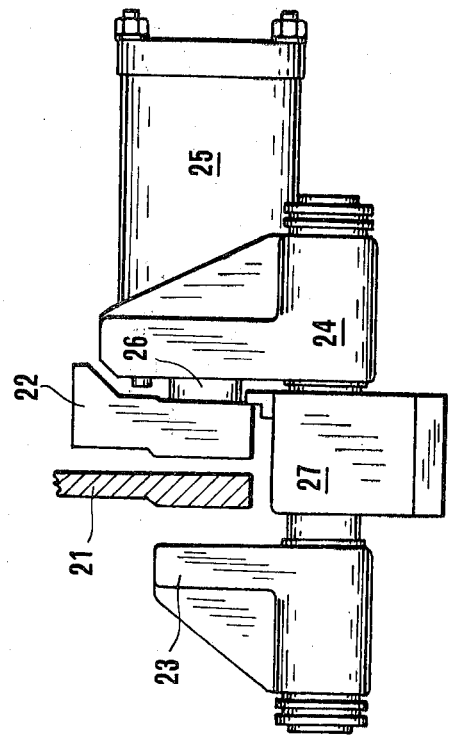
FIG. 2 is an enlarged side elevational view of the means for the electric connection between the movable table and the welding circuit.

Conversely, in the cases, which are more frequent, in which it is necessary for the welding circuit to be closed through the workpiece holding support, the second pole of the secondary winding of the transformer 10 is connected to a vertical bar 12, which may be cooled by water pipes 13 (FIG. 3), which bar extends vertically for a length which is proportional to the freedom of vertical movement of the head 7-8. Said vertical bar 12 passes into the body 14 of a sliding connection means, which body is fastened to a fixed portion of the structure 1-2 of the machine.

Supported within body 14 by means of pins 15 are contact shoes 16 disposed at the side of the bar 12 and pushed into electric contact against the latter by resilient means, which in the present case are constituted by stacks of belleville washers 17 inserted onto pins 18. Furthermore, the shoes 16 are resiliently pushed in electric contact against body 14 by resilient means which in the present case are constituted by stacks of belleville washers 19 inserted onto the pins 15.

Owing to this connection means the bar 12 may freely slide vertically together with the transformer 10 and the head 7-8 and remain in optimum electric contact with the body 14. This latter, in turn, is connected to the workpiece holding support by means of a suitable connection, for example a flexible strap 20 or a group of such straps.

In the machine shown, the workpiece holding support has the character of a rotary table 6. This table possesses on its lower side a rib 21 which could be circular and continuous but of which only those portions are necessary which correspond to working stations; thus, in the embodiment shown, the rib assumes the appearance of a plurality of separate plane plates 21. Of these plates, the one which is situated at the welding station has, disposed at the side of it, a conductive jaw 22 which is connected to the welding circuit. In the present case, this conductive jaw is connected through the straps 20 to the body 14 described in the foregoing. Alongside the plate 21 in the welding station there is also disposed a clamping jaw 23 connected to a movable support 24 which carries a hydraulic or pneumatic cylinder (or another driving means) 25 whose piston rod 26 acts on the conductive jaw 22. The movable support 24 is movably mounted, for the purpose of centering the jaws, on a stationary support 27 mounted on the lower bracket 1 of the machine.

When a welding operation is about to be effected, the cylinder, or the like, 25, is activated and clamps the plate or rib 21 between clamping means comprising the jaws 22 and 23, thereby establishing an optimum electric contact between the movable table 6 and the welding circuit. Conversely, during the periods of displacement of the table 6 the cylinder is released so that the jaws 22 and 23 move away from the plate 21 and do not hinder in any way the movement of the table.

Obviously, in the cases in which the movable table 6, instead of being of the rotary type, is of the translating type, the rib 21 has a rectilinear shape extending along the direction of movement and may be formed by separate plates aligned and corresponding to the various working stations.

Preferably, a shield 28 may protect the rib portion 21, or plates 21, which are not active, to avoid soilings which would successively hinder the conduction.

Having thus described our invention, what we claim is:

1. An electric resistance welding machine comprising a lower bracket, a workpiece holding device mounted on said lower bracket, an upper bracket, an implement holding head vertically movable in said upper bracket, a welding implement mounted in said implement holding head, and a welding transformer mechanically connected to said implement holding head, said welding transformer having first and second poles, said first pole being electrically connected to said welding implement, said machine further comprising a vertical bar mechanically connected to said welding transformer and electrically connected to said second pole, and a connection means mechanically connected to said lower bracket and electrically connected to said vertical bar and to said workpiece holding device.

2. An electric resistance welding machine as set forth in claim 1, wherein said connection means comprises a fixed body mechanically connected to said lower bracket and electrically connected to said workpiece holding device, a pair of contact shoes in said body, first resilient means arranged to push said contact shoes on both sides against said vertical bar, and second resilient means arranged to push said contact shoes against said fixed body.

3. A welding machine as set forth in claim 2, wherein said first and second resilient means comprise stacks of belleville washers.

4. An electric resistance welding machine comprising an upper bracket, an implement holding head vertically movable in said upper bracket, a welding implement mounted in said implement holding head, a welding transformer electrically connected to said welding implement, a lower bracket, a workpiece holding device mounted on said lower bracket and comprising a workpiece holding table movable along a fixed path, a rib extending downwardly from said table and oriented substantially along said path of movement and clamping means mounted on said lower bracket, electrically connected to said welding transformer and arranged to clamp said rib of the movable table during the welding periods.

5. A welding machine as set forth in claim 4, wherein said movable table is intended to assume a plurality of prefixed working positions, and said rib comprises a plurality of separate portions, each corresponding to one of said working positions of the table.

6. A welding machine as set forth in claim 4, wherein said clamping means comprises a conductive jaw connected to said welding transformer, a clamping jaw, said two jaws being arranged adjacent to and on both sides of said rib of the movable table, and a clamping device connected to both said jaws and acting therebetween.

7. A welding machine as set forth in claim 6, wherein said clamping device comprises a fixed support means mounted on said lower bracket, a movable support mounted on said fixed support and displaceable perpendicularly to said rib of the movable table, said clamping jaw being connected to said movable support, a fluidic cylinder mounted on said movable support, a piston rod reciprocable within said fluidic cylinder and connected to said conductive jaw.

8. A welding machine as set forth in claim 4, wherein a shield element is mounted on said lower bracket to cover and protect the portions of said rib not engaged by said clamping means.

9. An electric resistance welding machine comprising an upper bracket, an implement holding head vertically movable in said upper bracket, a welding transformer mechanically connected to said implement holding head, a vertical bar mechanically and electrically connected to said welding transformer, a lower bracket, a connection means mounted on said lower bracket and electrically connected to said vertical bar, a movable workpiece holding table mounted on said lower bracket, clamping means mounted on said lower bracket and engageable during the welding periods with portions of said table, and a flexible strap electrically connecting said connection means and said clamping means.

* * * * *